(12) United States Patent
Chiu et al.

(10) Patent No.: US 10,854,977 B2
(45) Date of Patent: Dec. 1, 2020

(54) COMPACT INTEGRATED THREE-BROADSIDE-MODE PATCH ANTENNA

(71) Applicant: The Hong Kong University of Science and Technology, Hong Kong (CN)

(72) Inventors: Chi Yuk Chiu, Hong Kong (CN); Ross David Murch, Hong Kong (CN)

(73) Assignee: THE HONG KONG UNIVERSITY OF SCIENCE & TECHNOLOGY, Hong Kong (CN)

( * ) Notice: Subject to any disclaimer, the term of this patent is extended or adjusted under 35 U.S.C. 154(b) by 26 days.

(21) Appl. No.: 16/220,916

(22) Filed: Dec. 14, 2018

(65) Prior Publication Data

US 2019/0198998 A1   Jun. 27, 2019

Related U.S. Application Data

(60) Provisional application No. 62/708,755, filed on Dec. 21, 2017.

(51) Int. Cl.
| | | |
|---|---|---|
| *H01Q 9/04* | (2006.01) | |
| *H01Q 9/26* | (2006.01) | |
| *H01Q 1/42* | (2006.01) | |
| *H01Q 15/24* | (2006.01) | |
| *H04B 7/10* | (2017.01) | |
| *H01Q 21/06* | (2006.01) | |

(52) U.S. Cl.
CPC ........... *H01Q 9/0414* (2013.01); *H01Q 1/428* (2013.01); *H01Q 9/26* (2013.01); *H01Q 15/24* (2013.01); *H01Q 21/065* (2013.01); *H04B 7/10* (2013.01)

(58) Field of Classification Search
CPC ............ H01Q 1/42; H01Q 1/428; H01Q 9/04; H01Q 9/0414; H01Q 9/26; H01Q 15/24; H01Q 1/36; H01Q 1/48; H01Q 1/50; H01Q 15/521; H01Q 21/06; H01Q 21/065; H01Q 21/0087
See application file for complete search history.

(56) References Cited

U.S. PATENT DOCUMENTS

| | | | |
|---|---|---|---|
| 4,410,891 A | 10/1983 | Schaubert et al. | |
| 5,880,694 A * | 3/1999 | Wang ................... | H01Q 9/0414 343/700 MS |

(Continued)

FOREIGN PATENT DOCUMENTS

TW    201731162 A    9/2017

OTHER PUBLICATIONS

Rusek, et al., "Scaling up MIMO: Opportunities and Challenges with Very Large Arrays," *IEEE Signal Process. Mag.*, 30(1): 40-60 (2013).

(Continued)

*Primary Examiner* — Hoang V Nguyen
(74) *Attorney, Agent, or Firm* — Leydig, Voit & Mayer, Ltd.

(57) ABSTRACT

A three-broadside-mode patch antenna includes: a rotationally symmetric radiator; a patch, wherein the patch is separated from the rotationally symmetric radiator by a dielectric and configured to capacitively feed the rotationally symmetric radiator; and three antenna probes, connected to the patch, configured to provide three antenna ports corresponding to three respective broadside radiation polarizations.

22 Claims, 14 Drawing Sheets

(56) References Cited

U.S. PATENT DOCUMENTS

| | | | |
|---|---|---|---|
| 6,717,549 | B2 | 4/2004 | Rawnick et al. |
| 6,897,808 | B1 | 5/2005 | Murch et al. |
| 7,629,930 | B2 | 12/2009 | Murch et al. |
| 7,973,718 | B2 | 7/2011 | Mak et al. |
| 8,547,289 | B2 | 10/2013 | Montgomery et al. |
| 8,659,498 | B2 * | 2/2014 | Rothwell ............ H01Q 9/0442 343/700 MS |
| 2005/0190106 | A1 * | 9/2005 | Anguera Pros .......... H01Q 1/36 343/700 MS |
| 2007/0097007 | A1 | 5/2007 | Milyakh |
| 2007/0279286 | A1 | 12/2007 | Coutts et al. |
| 2008/0100530 | A1 * | 5/2008 | Manholm ............ H01Q 9/0428 343/893 |
| 2008/0136734 | A1 * | 6/2008 | Manholm ............ H01Q 9/0414 343/893 |
| 2009/0128413 | A1 * | 5/2009 | Crouch ................... H01Q 3/26 343/700 MS |
| 2011/0032154 | A1 * | 2/2011 | Chung ................ H01Q 9/0414 343/700 MS |
| 2011/0111783 | A1 * | 5/2011 | Chayat .................. H04W 16/12 455/509 |
| 2011/0279339 | A1 | 11/2011 | Johnston |
| 2013/0072136 | A1 | 3/2013 | Besoli et al. |
| 2013/0113673 | A1 | 5/2013 | Kyria |
| 2015/0077299 | A1 * | 3/2015 | Tatarnikov ........... H01Q 9/0464 343/749 |
| 2015/0194730 | A1 * | 7/2015 | Sudo ...................... H01Q 9/045 343/905 |

OTHER PUBLICATIONS

Larsson, E., et al., "Massive MIMO for Next Generation Wireless Systems," *IEEE Commun. Mag.*, 52(2): 186-195 (2014).

Lu et al., "An Overview of Massive MIMO: Benefits and Challenges," *IEEE J. Sel. Topics in Signal Process.*, 8(5): 742-758 (2014).

Chiu et al., "Design and Implementation of a Compact 6-Port Antenna," *IEEE Antennas Wireless Propag. Lett.*, vol. 8, pp. 767-770, 2009.

Chen et al., "A Dual-Mode Wideband MIMO Cube Antenna with Magneto-Electric Dipoles," *IEEE Trans. Antennas Propag.*, 62(12): 5951-5959 (2014).

Moradikordalivand et al., "Common Elements Wideband MIMO Antenna System for WiFi/LTE Access-Point Applications," *IEEE Antennas Wireless Propag. Lett.*, 13: 1601-1604 (2014).

Stein, "On Cross Coupling in Multiple-Beam Antennas," *IRE Trans. Antennas Propag.*, 10(5): 548-557 (1962).

Chiou et al., "Broad-Band Dual-Polarized Single Microstrip Patch Antenna with High Isolation and Low Cross Polarization," *IEEE Trans. Antennas Propag.*, 50(3), 399-401 (2002).

Chen et al., "Experimental Study on Radiation Performance of Probe-Fed Suspended Plate Antennas," *IEEE Trans. Antennas Propag.*, 51(8): 1964-1971 (2003).

Sim et al., "Dual-feed dual-polarized patch antenna with low cross polarization and highisolation," *IEEE Trans. Antennas Propag.*, 57(10): 3405-3409 (2009).

Pinchera et al., "A dual-polarized parasitic patch antenna for MIMO systems," in Proc. 39th Europ. Microw. Conf. (EuMC), Rome, Italy, Sep. 29-Oct. 1,2009,642-644.

Gao et al., "Stacked Patch Antenna with Dual-Polarization and Low Mutual Coupling for Massive MIMO," *IEEE Trans. Antennas Propag.*, 64(10): 4544-4549 (2016).

Wu et al., "A Novel Design of Dual Circularly Polarized Antenna Fed by L-Strip," *Progress In Electromagnetics Research (Pier)*, 79: 39-46 (2008).

Harouni et al., "A Dual Circularly Polarized 2.45-GHz Rectenna for Wireless Power Transmission," *IEEE Antennas Wireless Propag. Lett.*, 10: 306-309 (2011).

Chou et al., "Novel T-Shape Slot Couple Feed Dual Circular Polarized Rectenna," in Proc. Int. Symposium Antennas Propag. (ISAP), Nagoya, Japan, Oct. 29-Nov. 2, 2012, 178-181.

Tsai et al., "Reconfigurable Square-Ring Microstrip Antenna," *IEEE Trans. Antennas Propag.*, 61(5): 2857-2860 (2013).

Kim et al., "A Novel Single-Feed Circular Microstrip Antenna with Reconfigurable Polarization Capability," *IEEE Trans. Antennas Propag.*, 56(3): 630-638 (2008).

Wu et al., "Wideband tri-polarization reconfigurable magneto-electric dipole antenna," *IEEE Trans. Antennas Propag.*, 65(4): 1633-1641 (2017).

Chiu et al., "Compact Three-Port Orthogonally Polarized MIMO Antennas," *IEEE Antennas Wireless Propag. Lett.*, vol. 6, pp. 619-622, 2007.

Garbacz, "Modal Expansions for Resonance Scattering Phenomena," *Proc. IEEE*, 53(8): 856-864 (1965).

Garbacz et al., "A Generalized Expansion for Radiated and Scattered Fields," *IEEE Trans. on Antennas Propag.*, 19(3) 348-358 (1971).

Harrington et al., "Theory of Characteristic Modes for Conducting Bodies," *IEEE Trans. Antennas Propag.*, 19(5): 622-628 (1971).

Harrington, "Computation of Characteristic Modes for Conducting Bodies," *IEEE Trans. Antennas Propag.*, 19(5): 629-639 (1971).

Tian et al., "Multiplexing Efficiency of MIMO Antennas," *IEEE Antennas Wireless Propag. Lett.*, 10: 183-186 (2011).

Safin et al., "Reconstruction of the Characteristic Modes on an Antenna Based on the Radiated Far Field," *IEEE Trans. Antennas Propag.*, 61(6): 2964-2971 (2013).

CST Microwave Studio, CST Studio Suite TM, (2017).

Feko 14.0, Altair Engineering Inc., (2016).

Tian, et al., "A Compact Six-Port Dielectric Resonator Antenna Array: MIMO Channel Measurements and Performance Analysis," *IEEE Trans. Antennas Propag.*, 58(4): 1369-1379, (2010).

Lee et al., "Characteristics of the Equilateral Triangular Patch Antenna," *IEEE Transactions on Antennas and Propagation*, 36(11): (1988).

Zhu et al., "A Compact Tri-Band Monopole Antenna With Single-Cell Metamaterial Loading," *IEEE Transactions on Antennas and Propagation*, 58(4): (2010).

Ko et al., "Compact Integrated Diversity Antenna for Wireless Communications," *IEEE Trans. Antennas Propagat.*, 49(6): 954-960 (2001).

Manteuffel et al., "Compact Multimode Multielement Antenna for Indoor UWB Massive MIMO," *IEEE Trans. Antennas Propagat.*, 64(7): 2689-2697 (2016).

* cited by examiner (a)

(b)

(c)

(a)

(b)

(a)

(b)

(a)

(b)

US 10,854,977 B2

COMPACT INTEGRATED THREE-BROADSIDE-MODE PATCH ANTENNA

CROSS-REFERENCE TO RELATED APPLICATIONS

This patent application claims the benefit of U.S. Provisional Patent Application No. 62/708,755, filed Dec. 21, 2017, which is incorporated herein by reference in its entirety.

BACKGROUND

A promising 5th generation (5G) technology for base stations is to use massive multiple-input multiple-output (MIMO) to increase data throughput and serve more devices simultaneously. Massive MIMO uses a large number of small antennas to create more possible signal paths to improve data rate and link reliability. If a line-of-sight (LoS) propagation environment is considered, more directive antenna elements can provide better spectrum efficiency and reduce the associated radiated power. Usually, the number of antenna ports in massive MIMO corresponds to a couple of hundreds or more. In order to make massive MIMO antennas more compact, or to build more radiating elements in a specific area, multi-mode antennas may be considered.

Various multi-mode antennas have been proposed over the past few decades. The most fundamental and classical example is a square patch fed by two coaxial probes creating vertical and horizontal polarized radiations simultaneously. Separated parasitic or connected patches can also be added next to a driven radiating element providing dual-polarized radiations. A feeding mechanism such as dual-feed or single-feed with a switching element like a diode or a micro electro mechanical switch (MEMS) are commonly used in dual-mode antennas. Apart from vertical and horizontal linear polarizations, left-hand and right-hand circular polarizations (LHCP and RHCP) can also be realized. A compact integrated Y-shaped patch antenna can also be used to generate two-broadside-mode radiations by choosing proper locations for two coaxial feeds. In general, a two-mode antenna with broadside radiation patterns is easy to achieve due to the inherent two orthogonal polarizations.

A compact antenna beyond two modes is difficult to implement owing to high and complicated mutual coupling between antenna ports. Various decoupling techniques have been proposed and developed to suppress ports mutual coupling, such as inserting a defected ground structure, a scattering element, a decoupling network, etc. Another example shows that three monopole antennas can be arranged to produce three sectorized radiation patterns in azimuth plane. Nevertheless, a practical and compact beyond-two-broadside-mode antenna using such conventional technologies has not been achieved.

SUMMARY

In an exemplary embodiment, the invention provides a three-broadside-mode patch antenna. The three-broadside-mode patch antenna includes: a rotationally symmetric radiator; a patch, wherein the patch is separated from the rotationally symmetric radiator by a dielectric and configured to capacitively feed the rotationally symmetric radiator; and three antenna probes, connected to the patch, configured to provide three antenna ports corresponding to three respective broadside radiation polarizations.

In another exemplary embodiment, the invention provides a massive-input massive-output (MIMO) antenna. The MIMO antenna includes: a plurality of three-broadside-mode patch antenna cells. Each of the plurality of three-broadside-mode patch antenna cells includes: a rotationally symmetric radiator; a patch, wherein the patch is separated from the rotationally symmetric radiator by a dielectric and configured to capacitively feed the rotationally symmetric radiator; and three antenna probes, connected to the patch, configured to provide three antenna ports corresponding to three respective broadside radiation polarizations.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
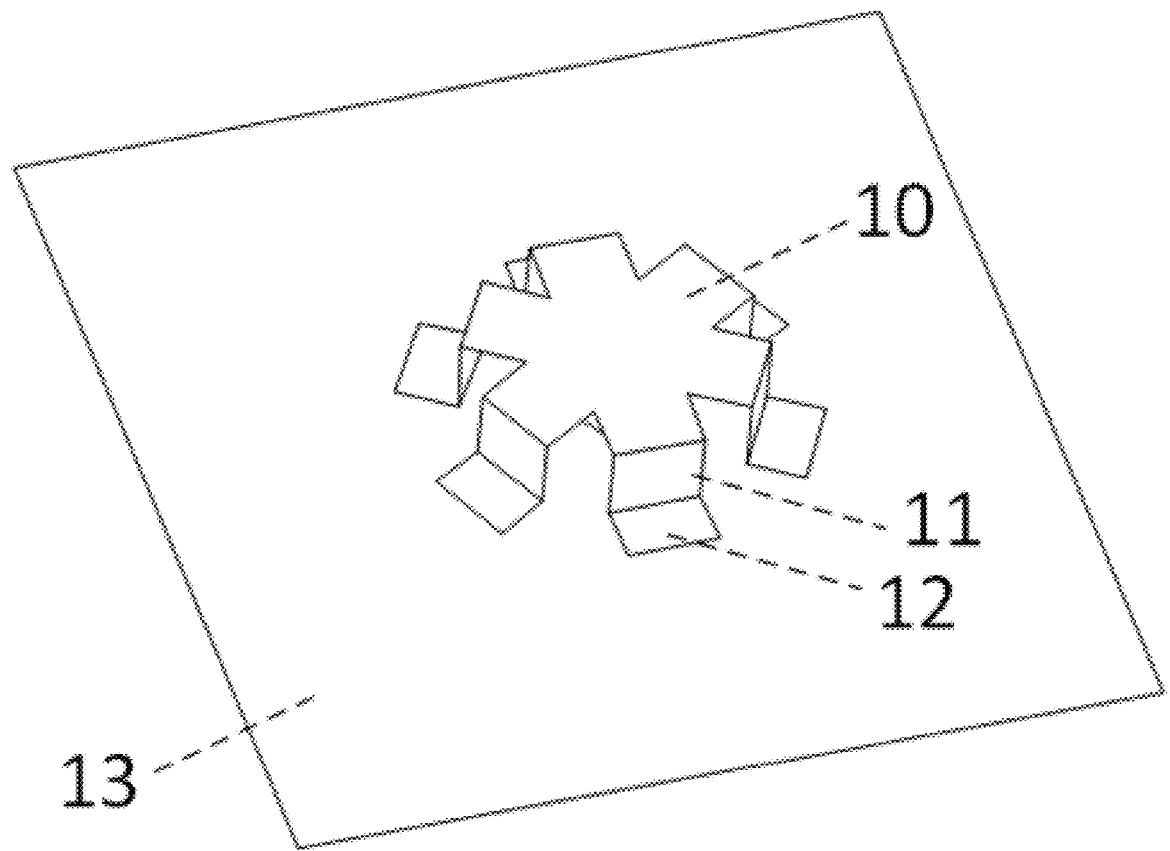
FIGS. 1(a)-1(d) show a structure of a compact 3-broadside-mode patch antenna according to an exemplary embodiment (including: (a) a first perspective view, (b) a second perspective view without a top portion of the patch radiator, (c) a third perspective view without a top portion of the patch radiator and further without two legs of the patch radiator; and (d) exemplary dimensions (in mm) of certain elements depicted in FIGS. 1(a)-1(c))

A conventional patch antenna only exhibits two broadside mode radiations which are usually referred to as vertical and horizontal polarizations. Exemplary embodiments of the present application, however, provide a compact three-broadside-mode patch antenna having three broadside mode radiations (e.g., corresponding to 0, 120 and 240 degrees).

Exemplary embodiments of the present application provide an integrated structure of three patch antennas (i.e., a three-broadside-mode patch antenna or "3-port antenna"), wherein all antenna ports have broadside radiation patterns and exhibit low mutual coupling. The three-broadside-mode patch antenna provides low mutual coupling between three antenna ports and provides three broadside radiation patterns. The three-broadside-mode patch antenna may be compact in size.

In a first exemplary implementation, a snowflake-shaped radiator with a side length of 35 mm, corresponding to $0.33\lambda_0$ ($\lambda_0$ is the wavelength in a vacuum), and having one shorting pin at the center of a hexagonal patch, corresponding to a resonant frequency of 2.8 GHz, is able to accommodate three antenna ports resonated at the same frequency. In a second exemplary implementation, a snowflake-shaped radiator with a side length of 35 mm, corresponding to $0.36\lambda_0$ ($\lambda_0$ is the wavelength in a vacuum), and having three shorting pins evenly distributed next to three probes, corresponding to a resonant frequency of 3.05 GHz, is able to accommodate three antenna ports resonated at the same frequency.

In an exemplary implementation, according to both simulation and experimental results (which were consistent with one another), mutual coupling nulls (corresponding to local minima in a frequency response plot) were found and coincided with the resonant frequency of the antenna ports, indicating low mutual coupling at the resonant frequency.

For better impedance matching, three coaxial probes are connected to a common hexagonal patch which is used to capacitively feed the snowflake-shaped radiator on top. The common hexagonal patch is excited by the three coaxial probes simultaneously to capacitively feed the snowflake-shaped radiator. There is no physical connection between the probes and the snowflake-shaped radiator, as the snowflake-shaped radiator is suspended above the common hexagonal patch (e.g., by being separated from the common hexagonal patch by a dielectric such as polyethylene terephthalate (PET), paper, wood or Styrofoam).

Each of the six legs of the snowflake-shaped radiator may have two folds to form a first portion perpendicular to the ground plane and a second portion parallel to the ground plane. It will be appreciated that the six legs may all be integrally formed as part of the radiator (e.g., each leg is part of an integral piece of material that has six folds), or that the six legs may be formed of separate materials attached together (e.g., each leg may include a piece of material having one fold being attached to a snowflake-shaped radiator). The separation of the radiator from the patch and the folded shape of the legs provides a capacitive loading effect leading to miniaturization of the entire three-broadside-mode patch antenna.

Since the three antenna ports of the three-broadside-mode patch antenna according to an exemplary embodiment have a 120-degree rotational symmetry, the characteristics of the three antenna ports may be identical (e.g., the three antenna ports exhibit rotationally symmetric radiation characteristics such that antenna gain, efficiency, radiation pattern, impedance bandwidth, impedance matching, and mutual coupling may be the same).

When a hexagonal ground plane (which corresponds to the six-legged shape of the snowflake-shaped radiator) is used, the three-broadside-mode patch antenna may be used as a building block for building a massive multiple-input multiple-output (MIMO) antenna, since the hexagonal ground planes of adjacent antennas will fit together in a honeycomb structure. All radiating elements within the massive MIMO antenna can produce broadside radiations. Since each three-broadside-mode patch antenna has three antenna ports, with each antenna port producing one broadside mode radiation, a 50% increase in antenna ports is achieved relative to that of a massive MIMO antenna which is constructed by conventional half-wavelength dual-polarized patch antennas. Further, the use of a snowflake-shaped radiator which provides a modal radiation pattern supporting 3 nearly orthogonal pattern vectors allows for the third polarization to be achieved with low mutual coupling, allowing exemplary embodiments of the three-broadside-mode patch antenna to be usable in practice.

It will be appreciated that special materials and special manufacturing processes are not required to implement exemplary embodiments of the compact 3-broadside-mode patch antenna discussed herein. As with other efficient antennas, high conducting metals (having low resistivity) may be used. Further, it will be appreciated that a SubMiniature version A (SMA) connector may be used as the interface at the backside of the ground plane for testing exemplary implementations of the compact 3-broadside-mode patch antenna.

Figure 1B:
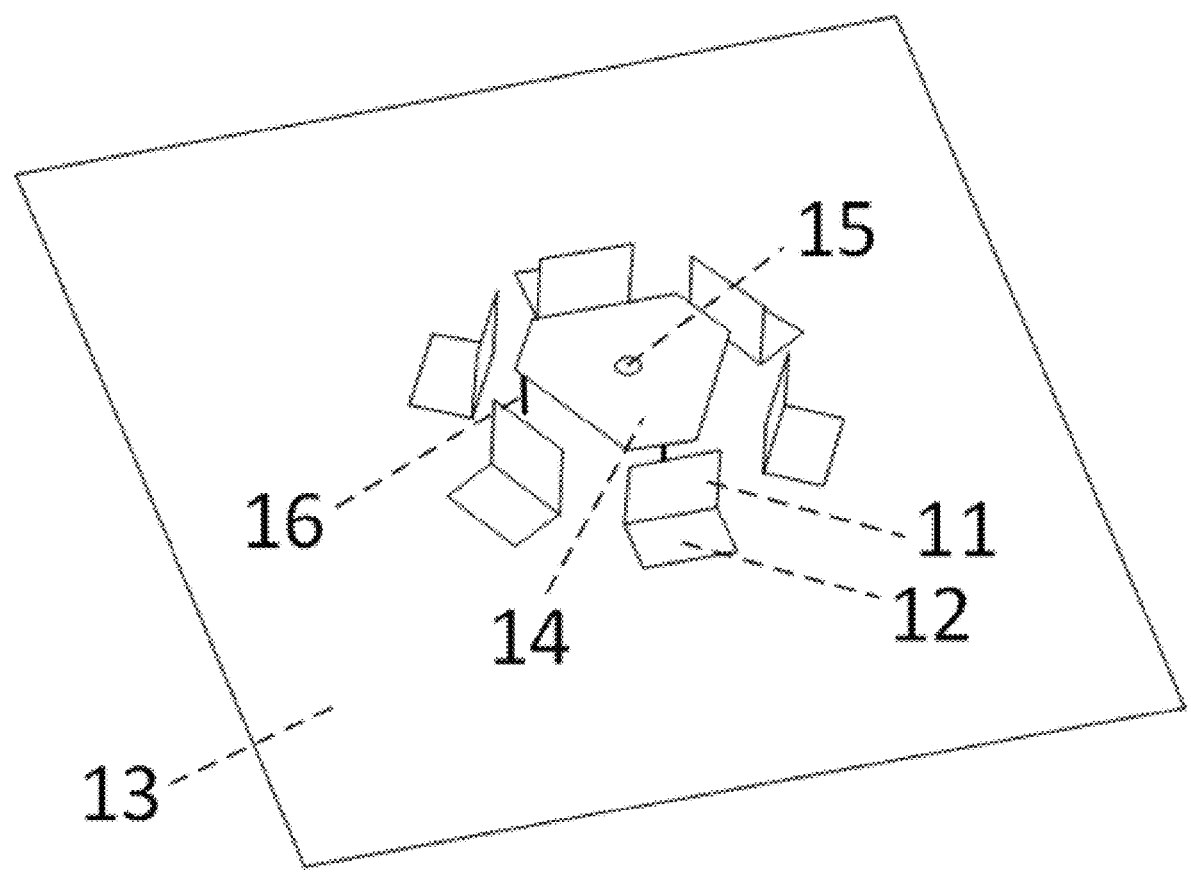
Figure 1C:
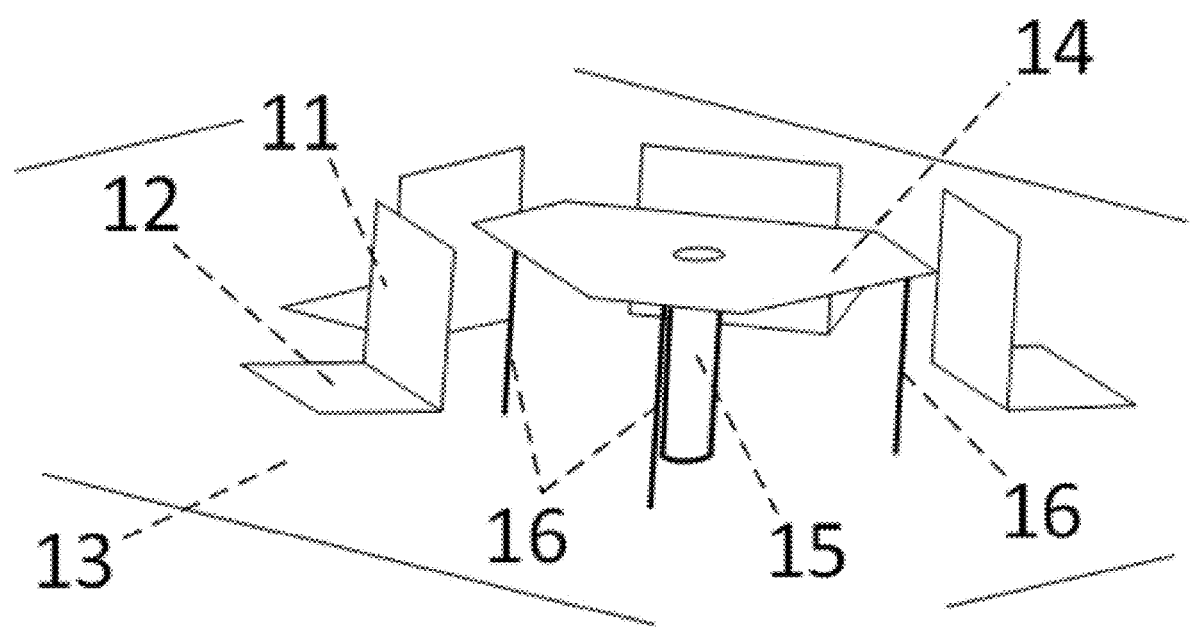

FIGS. 1(a)-1(c) show a structure of a compact 3-broadside-mode patch antenna according to an exemplary embodiment.

FIG. 1(a) shows a first perspective view of the compact 3-port antenna. The antenna includes a radiator 10 (the depicted radiator 10 is a snowflake-shaped patch radiator) which may be made of metal (e.g., copper or aluminum) and may be held up in the air by separating the radiator 10 from a patch of the antenna using a dielectric. The six legs of the radiator 10 each include a first portion 11 and a second portion 12. For example, as depicted in FIG. 1(a), the first portion 11 may be upright and the second portion 12 may be flat, such that each of the six legs of the snowflake-shaped radiator may have two folds, with the first portion 11 perpendicular to the ground plane and the second portion 12 parallel to the ground plane. The ground plane 13 may also be made of metal (e.g., copper or aluminum).

The second portion 12 of each leg does not have any physical connection with the ground plane 13 and thus provides a capacitive loading effect for the antenna. For a capacitor constructed of two parallel plates separated by a distance, capacitance is proportional to the area of overlap and inversely proportional to the separation between conducting sheets. With the folded structure of FIG. 1(a) where multiple second portions 12 are close to the ground plane, the radiator 10 provides capacitive loading which alters the antenna input impedance in a way that provides a shorter resonance length. This allows for antenna miniaturization to be realized.

It will be appreciated that the ground plane 13 may be rectangular, circular, hexagonal or any other shape. However, in certain exemplary embodiments, when multiple antennas are jointed together (e.g., to form a massive MIMO antenna), certain shapes (e.g., hexagonal) may be advantageous due to being able to symmetrically join multiple antennas together.

FIG. 1(b) shows a second perspective view of the compact 3-port antenna without a top portion of the patch radiator (i.e., a top portion of the radiator 10 from FIG. 1(a) is removed to show other elements of the antenna). The six legs of the radiator and the ground plane 13 remain the same as shown in FIG. 1(a). Under the top portion of the patch radiator, there is a hexagonal patch 14 supported by a shorting pin 15 and three antenna probes 16. The hexagonal patch 14 works as a noncontact (or "capacitive") feeding mechanism. By changing the area of the feed plate (hexagonal patch), the separation from the radiating top plate, and probe placement on the feed plate, the resonance properties of the antenna may be controlled, which provides more design flexibility relative to direct feed mechanisms. The shorting pin 15 is connected to both the hexagonal patch 14 and the ground plane 13, and the shorting pin alters the current distribution of the hexagonal patch which changes the antenna input impedance. The hexagonal patch 14 and the shorting pin 15 are both made of metal (e.g., copper), and may be attached via soldering. The shorting pin 15 is located at the center of the hexagonal patch 14, and the three antenna probes 16 are evenly distributed around the hexagonal patch 14. The three antenna probes 16 correspond to three antenna ports used to excite the hexagonal patch 14, which in turn capacitively feeds the radiator 10. The other end of the antenna probes 16 may be, for example, connected to an SMA connector interface. The even distribution of the three antenna probes 16 provides for identical antenna properties (except for their different polarizations) for the three antenna ports and also provides 120-degree rotational symmetry.

As discussed above, there is no physical connection between the radiator 10 and the hexagonal patch 14, which provides for a capacitive feeding effect.

FIG. 1(c) shows a third perspective view of the compact 3-port antenna without the top-side patch radiator and further without two legs of the antenna. As can be seen in this figure, the shorting pin 15 is connected to the ground plane 13 and the hexagonal patch 14. And as discussed above, the three antenna probes 16 are evenly distributed around the hexagonal patch 14.

Figure 1D:
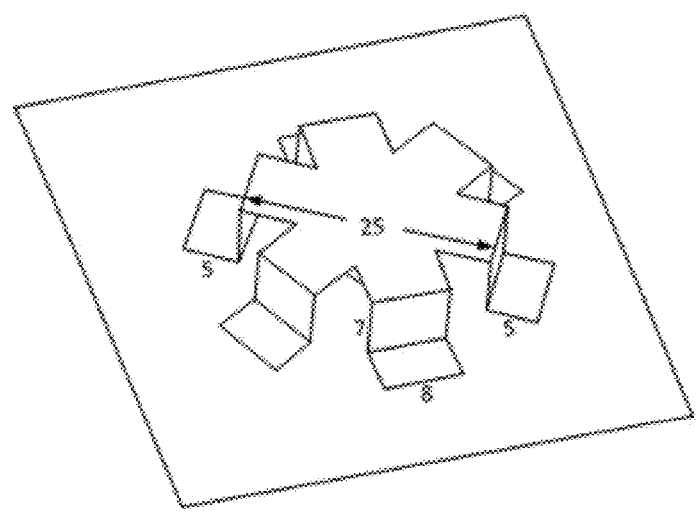
Figure 1D:
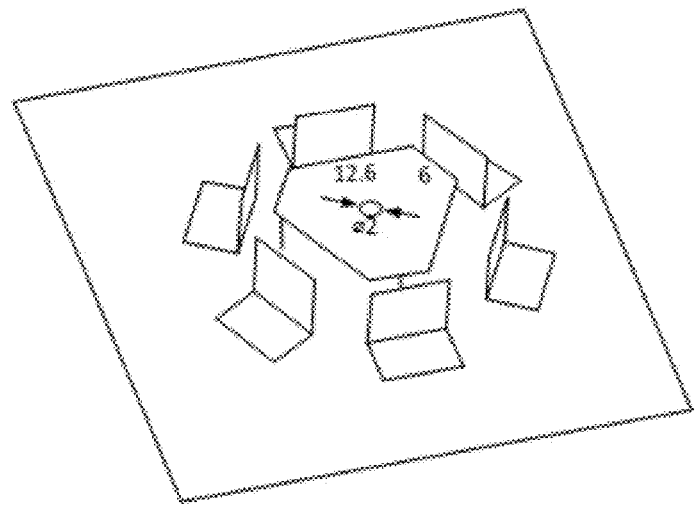
Figure 1D:
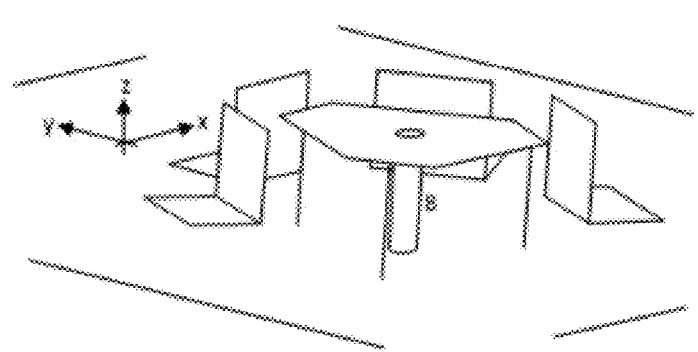

FIG. 1(d) shows exemplary dimensions (in mm) of certain elements depicted in FIGS. 1(a)-1(c) for a compact 3-port antenna that resonates at 2.8 GHz. Part (a) of FIG. 1(d) shows that the largest lateral dimension of the snowflake-shaped radiator is 5 mm+25 mm+5 mm (35 mm), corresponding to $0.33\lambda_0$. The height of the first portion of each leg is 7 mm, and the width of each leg is 8 mm Part (b) of FIG. 1(d) shows that the hexagonal patch may have side lengths of 12.6 mm and 6 mm, and Part (c) of FIG. 1(d) shows that the height of the shorting pin is 8 mm. Additionally, there is 1 mm of separation between the snowflake-shaped radiator and the patch (e.g., via a dielectric such as air). It will be appreciated that other exemplary implementations may utilize other respective dimensions and other resonant frequencies.

Figure 2:
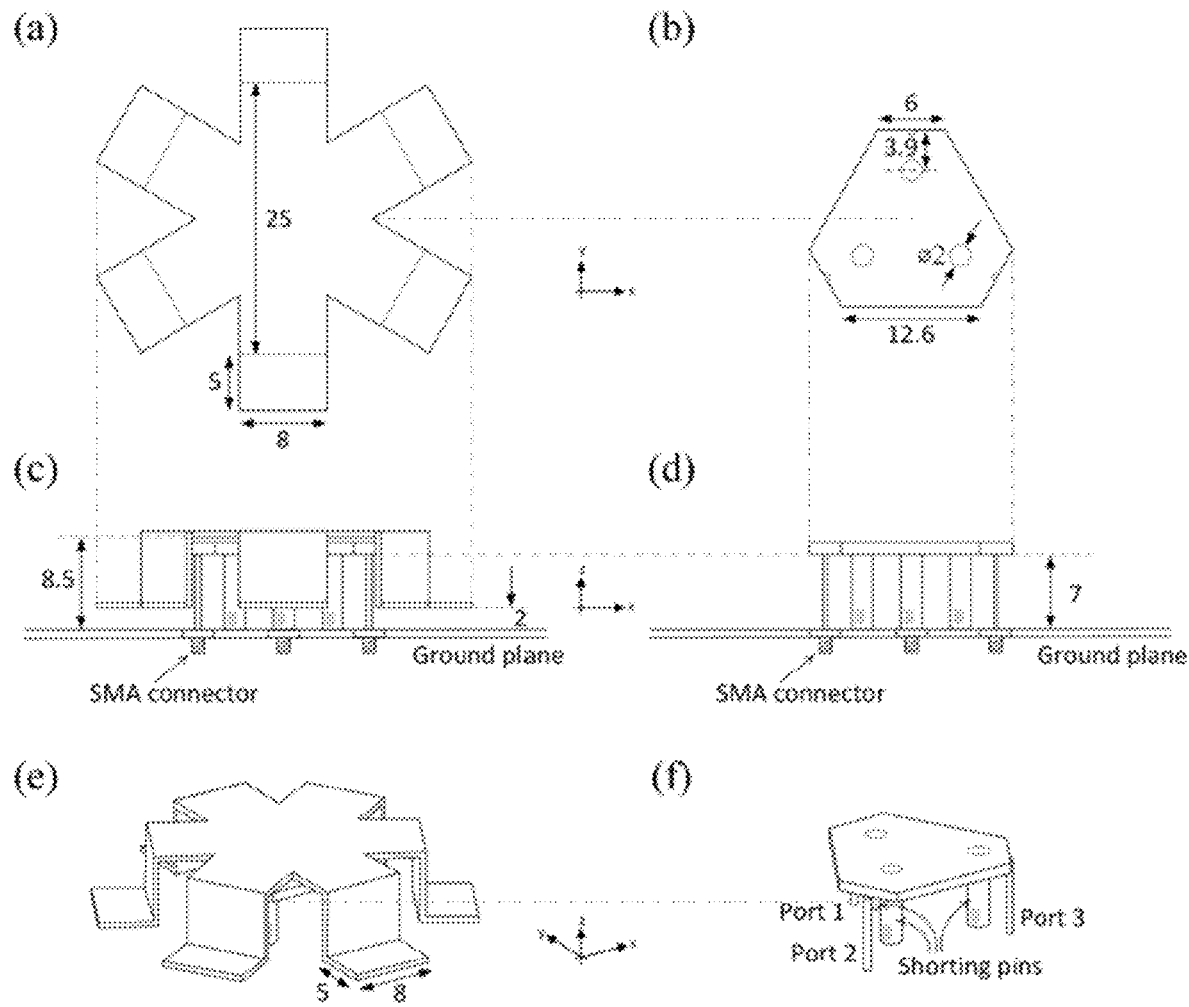
FIG. 2 shows an exemplary implementation of the compact 3-broadside-mode patch antenna depicted in FIGS. 1(a)-1(c), with dimension information in mm.

FIG. 2 shows another exemplary implementation of a compact 3-broadside-mode patch antenna, with dimension information in mm. As discussed above with respect to FIGS. 1(a)-1(c), the snowflake-shaped patch radiator has folded structures producing six capacitive loads to the antenna for miniaturization. The height of the air gap corresponding to each capacitive load is 2 mm. The ground plane is made on a circular FR4 epoxy board with diameter of 100 mm and having three SubMiniature version A (SMA) connectors soldered as the antenna interface. Copper or aluminum may be used for the construction of the snowflake-shaped patch radiator with folded structure. In addition to the capacitive loads, capacitive feeds are also provided (via a hexagonal patch) to achieve better impedance matchings. Part (a) of FIG. 2 shows the snowflake-shaped patch radiator. Part (b) of FIG. 2 shows the hexagonal patch. In this exemplary implementation, the material thicknesses of the snowflake-shaped patch radiator and the hexagonal patch are 0.5 mm and 1.0 mm, respectively. Furthermore, three 7 mm-long copper shorting pins with diameters of 2 mm are evenly distributed next to the three probes, as shown in parts (c) and (d) of FIG. 2. Part (e) of FIG. 2 shows a perspective view of the exterior structure, and part (f) of FIG. 2 shows a perspective view of the inner structure. Three antenna probes are connected to the hexagonal patch, but do not directly contact the snowflake-shaped radiator. The snowflake-shaped patch radiator is separated from the hexagonal patch via a dielectric (such as air), such that it is excited by the capacitive coupling of the non-contact hexagonal patch underneath. The ground plane may have a regular hexagonal shape, such that the entire antenna structure has 120-degree rotational symmetry, and is scalable to any number of antennas in the xy-plane.

It will be appreciated that the number of shorting pins used in a particular exemplary embodiment may vary. Using multiple shorting pins, such as three shorting pins as depicted in FIG. 2, may provide more accuracy when constructing a three-broadside-mode patch antenna by hand. Changing the number and/or location of shorting pin(s) affects the antenna input impedance matching, so different configurations of shorting pin(s) may correspond to different resonant frequencies (e.g., 2.8 GHz with one shorting pin in the center of a hexagonal patch versus 3.05 GHz with three shorting pins evenly distributed next to three probes.

Figure 3:
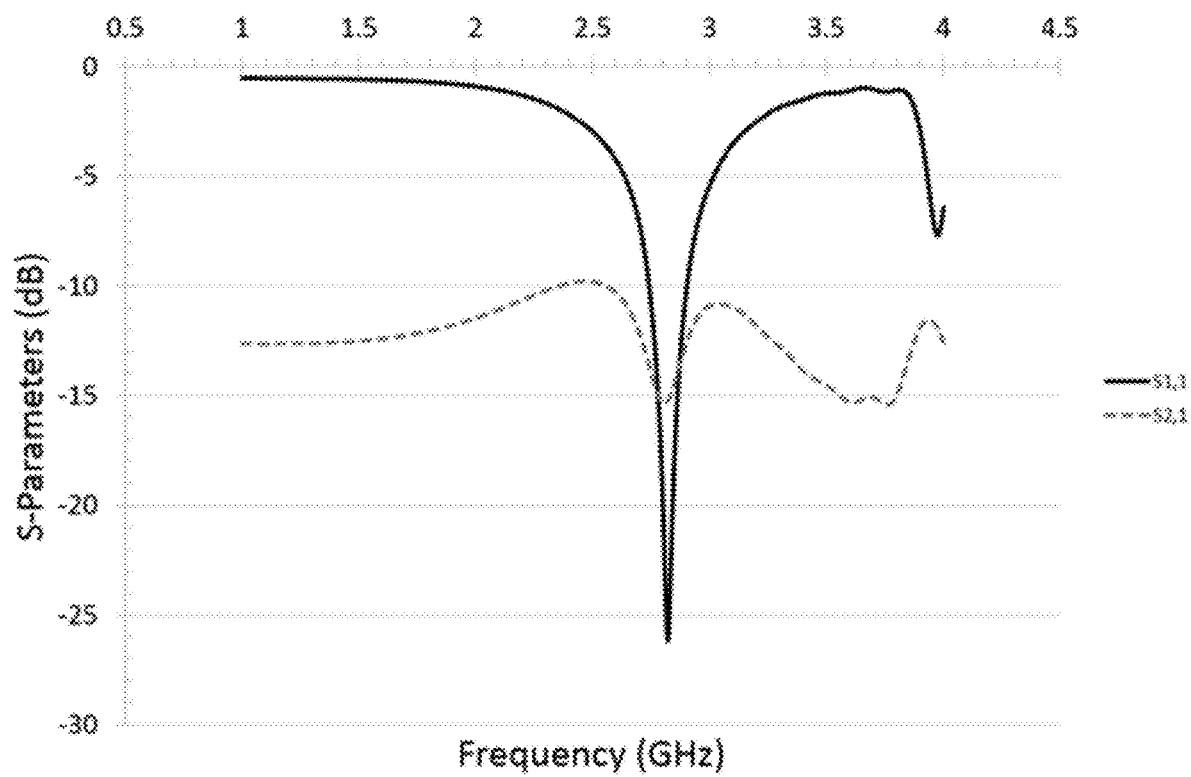
FIG. 3 shows a simulated frequency response of the compact 3-broadside-mode patch antenna with respect to a first antenna port.

FIG. 3 shows a simulated plot of variation of S-parameters along with frequency with respect to a first antenna port (antenna port 1). Since the geometry and the three excitations of the antenna are rotationally symmetric, the S-parameters with respect to the other antenna ports (antenna ports 2 and 3) would be the same. In this example, the antenna resonates at 2.8 GHz with mutual coupling of −15 dB.

Figure 4:
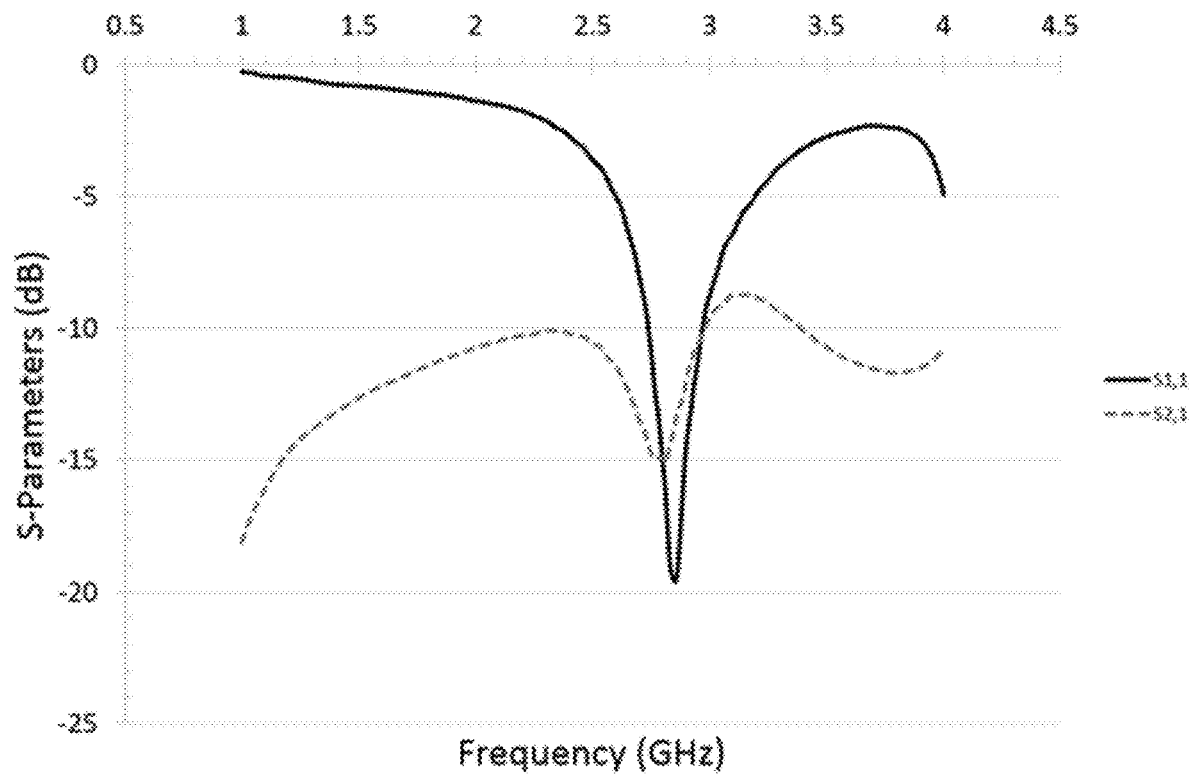
FIG. 4 shows a measured frequency response of the compact 3-broadside-mode patch antenna with respect to a first antenna port.

FIG. 4 shows a measured plot of variation of S-parameters along with frequency with respect to a first antenna port (antenna port 1). When compared to FIG. 3, it can be seen that the simulation results are consistent with the measurement results.

Figure 5:
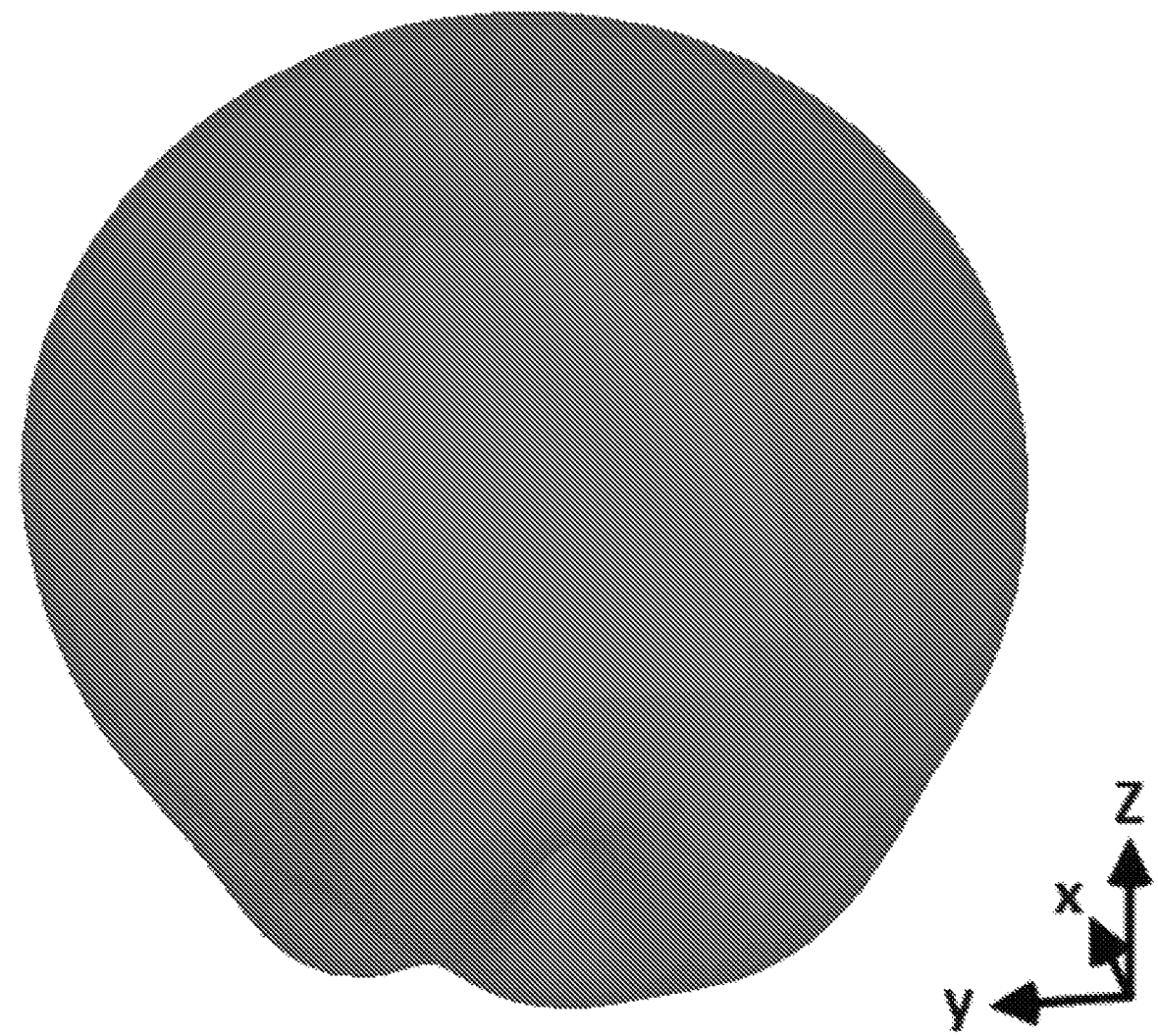
FIG. 5 shows a simulated radiation pattern of the compact 3-broadside-mode patch antenna with respect to a first antenna port at 2.8 GHz.

FIG. 5 shows a simulated radiation pattern of a compact 3-broadside-mode patch antenna at 2.8 GHz with respect to a first antenna port (antenna port 1). The radiation patterns of the other antenna ports (antenna ports 2 and 3) would be the same but rotated by +/−120 degrees due to the rotationally symmetric antenna geometry. Since the radiation pattern of the first antenna port (antenna port 1) is directed perpendicular to the plane of the top portion of the radiator, the radiation patterns of the other two antenna ports are also directed perpendicular to the plane of the top portion of the radiator.

Figure 6:
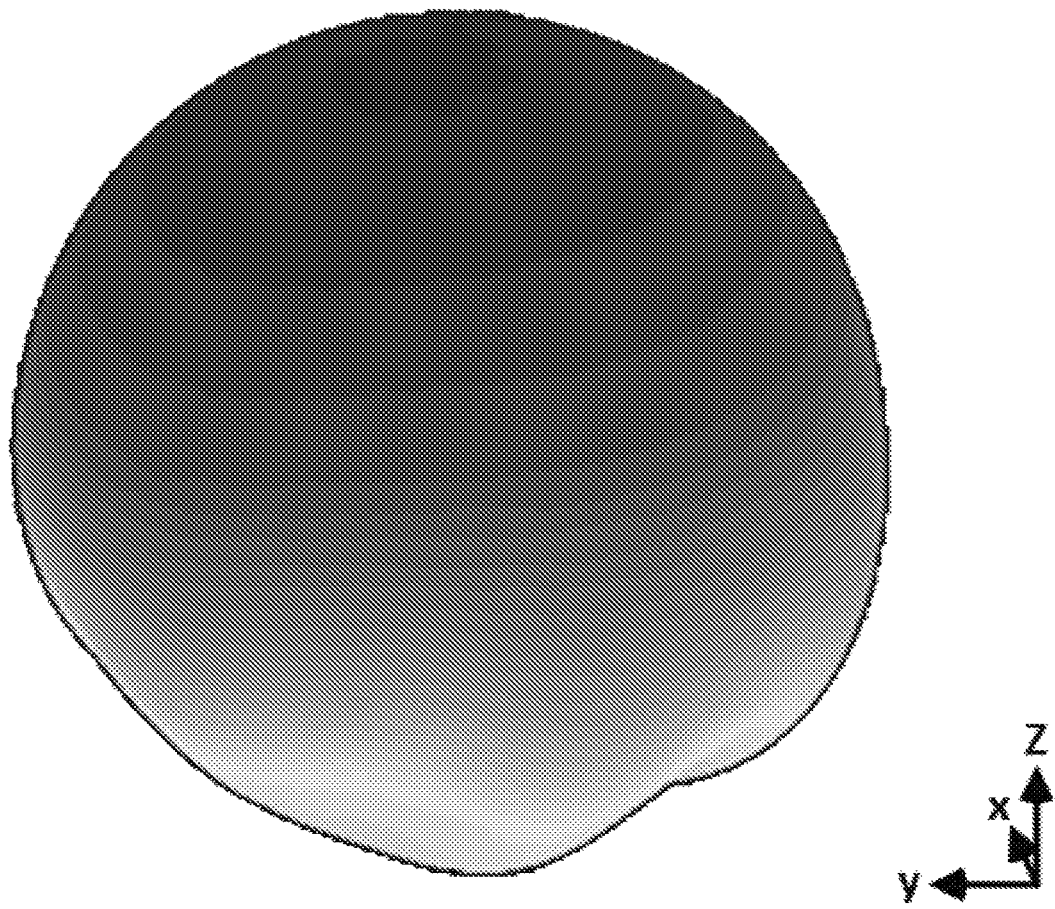
FIG. 6 shows a measured radiation pattern of the compact 3-broadside-mode patch antenna with respect to a first antenna port at 2.8 GHz.

FIG. 6 shows a measured radiation pattern of a compact 3-broadside-mode patch antenna with respect to a first antenna port (antenna port 1) at 2.8 GHz. The other antenna ports (antenna ports 2 and 3) are terminated with 50Ω loads during measurement. When compared to FIG. 5, it can be seen that the simulation results are consistent with the measurement results.

As mentioned above, multiple compact 3-broadside-mode patch antennas (or "compact 3-port antennas") may be joined together in an extendable manner having any number of unit cells (e.g., similar to the cells of a cellular network) to form a MIMO antenna. It will be appreciated that once the ground planes of multiple antennas are joined together, a larger common ground plane is formed with respect to the multiple antennas being joined together. It will further be appreciated that, alternatively, multiple antennas may be formed on a single common ground plane.

Figure 7:
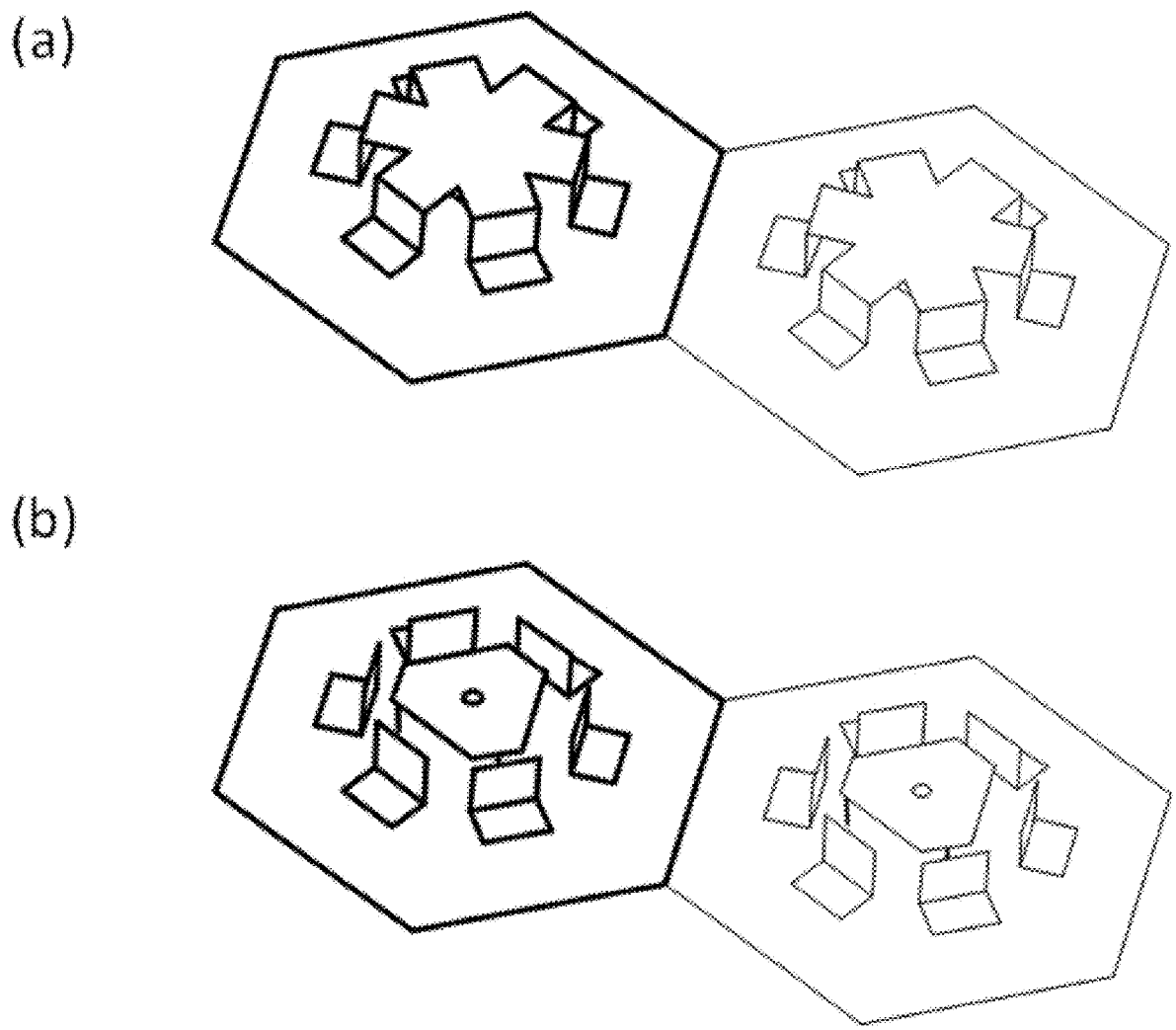
FIG. 7 shows two antennas with hexagonal ground planes joined together according to an exemplary embodiment (including: (a) a first perspective view, and (b) a second perspective view without the top portions of the patch radiators)
Figure 8:
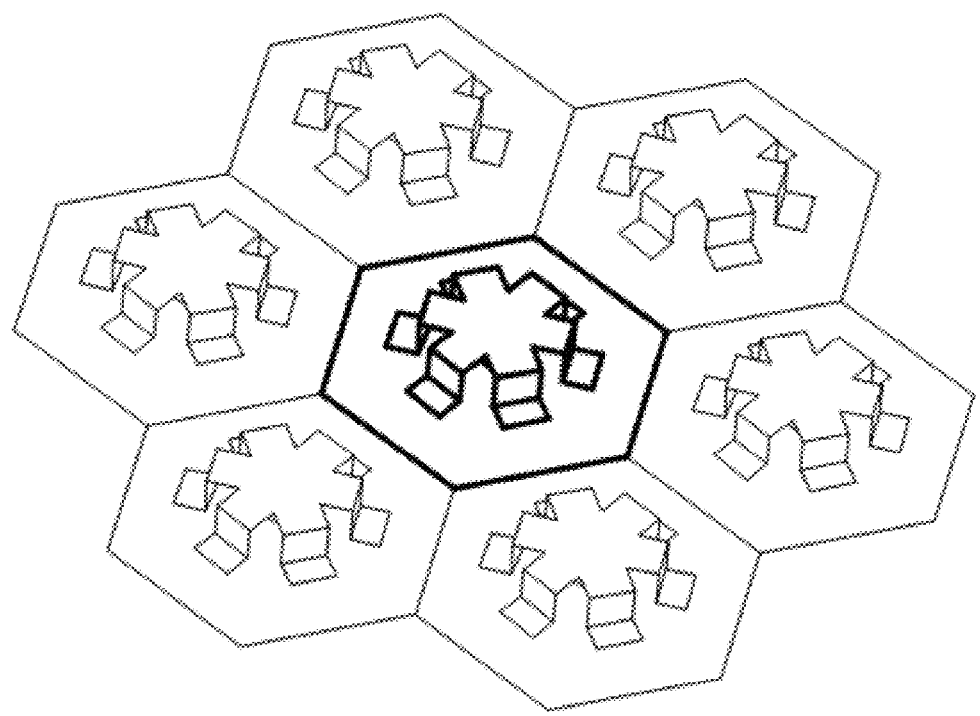
FIG. 8 shows seven antennas with hexagonal ground planes joined together according to an exemplary embodiment (including: (a) a first perspective view, and (b) a second perspective view without the top portions of the patch radiators)
Figure 8:
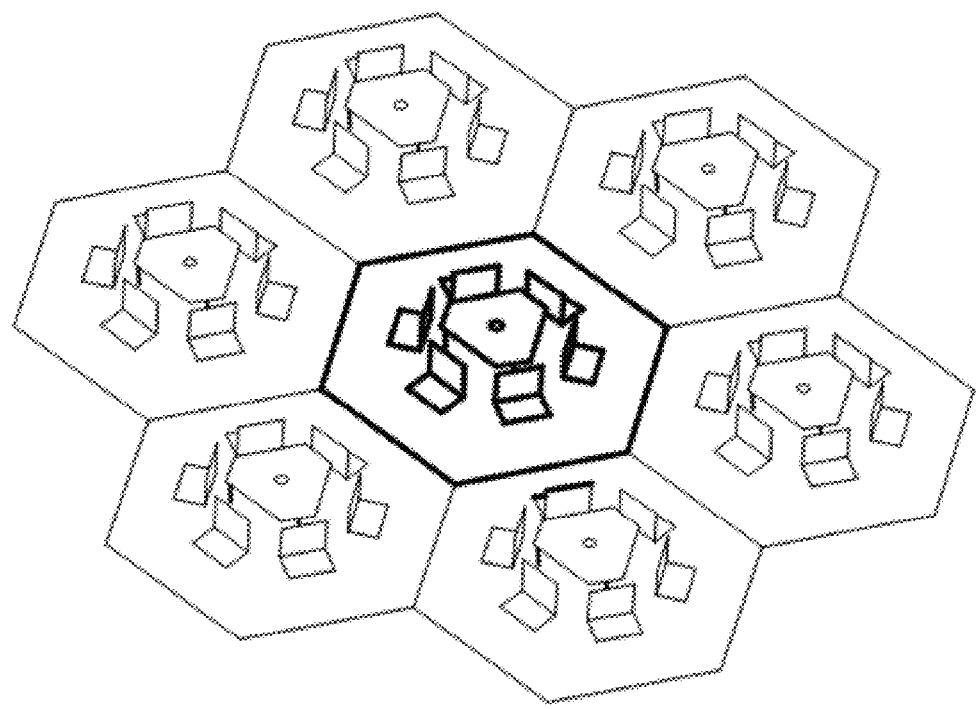
Figure 9:
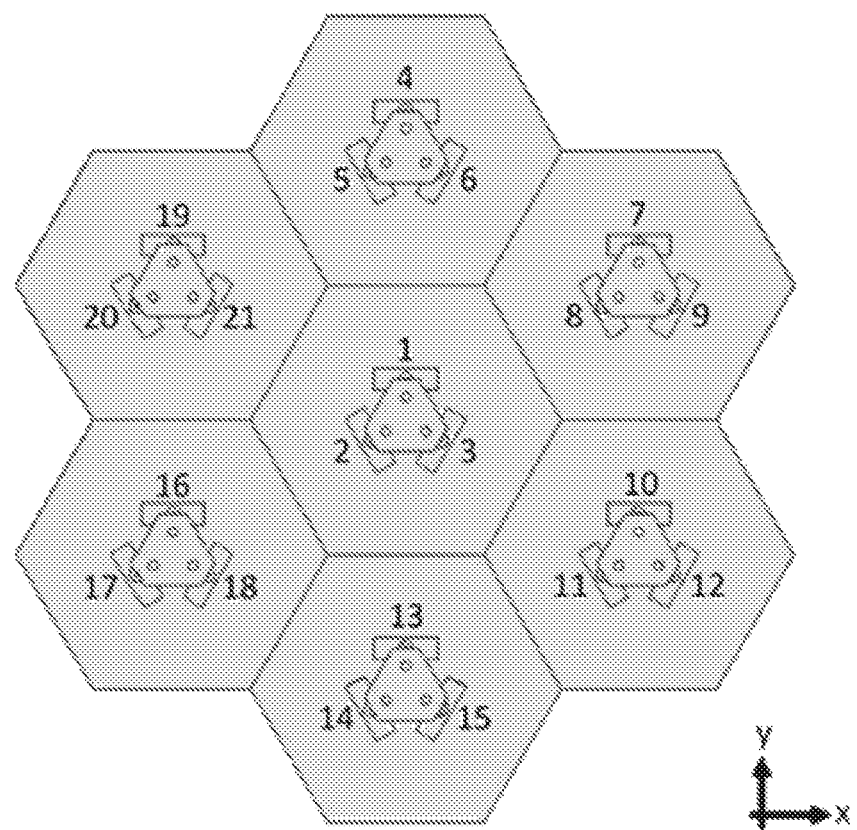
FIG. 9 shows another example of seven antennas with regular hexagonal ground planes joined together according to an exemplary embodiment (including: (a) a top view of the seven antennas without the top portions of the radiators, and (b) a perspective view of the seven antennas).
Figure 9:
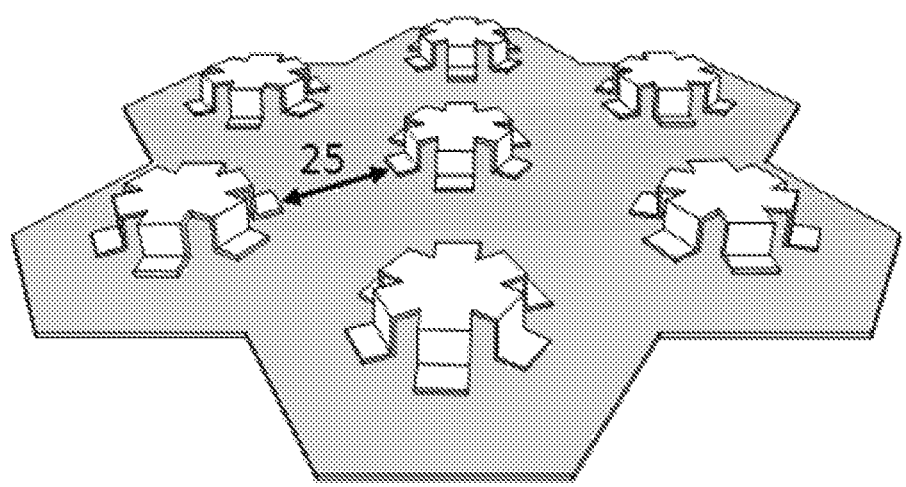

FIG. 7 shows two antennas with hexagonal ground planes joined together according to an exemplary embodiment. Part (a) of FIG. 7 shows a first perspective view of two compact 3-port antennas with regular hexagonal ground planes (which may each have the same structure as shown and described above in connection with FIGS. 1(a)-1(c)) being joined together. Part (b) of FIG. 7 shows a second perspective view of the two compact 3-port antennas with regular hexagonal ground planes without the top portions of the patch radiators. FIG. 8 shows seven antennas with hexagonal ground planes joined together according to an exemplary embodiment. Part (a) of FIG. 8 shows a first perspective view of seven compact 3-port antennas with regular hexagonal ground planes (which may each have the same structure as shown and described above in connection with FIGS. 1(a)-1(c)) being joined together. Part (b) of FIG. 8 shows a second perspective view of the seven compact 3-port antennas with regular hexagonal ground planes without the top portions of the patch radiators. FIG. 9 shows another example of seven antennas with regular hexagonal ground planes joined together according to an exemplary embodiment. Part (a) of FIG. 9 shows a top view of the seven antennas with regular hexagonal ground planes (which may each have the same structure as shown and described above in connection with FIGS. 1(a)-1(c)) without the top-side patch radiators and with antenna ports labeled 1-21. Part (b) of FIG. 9 shows a perspective view of the seven antennas with, for example, 25 mm of distance between respective legs of two top-side patch radiators (which provides for most or all inter-element mutual coupling coefficients being less than −20 dB). It will be appreciated that adjacent antennas are separated by some distance (such as 25 mm) to keep coupling low between separate unit cell antennas.

Figure 10:
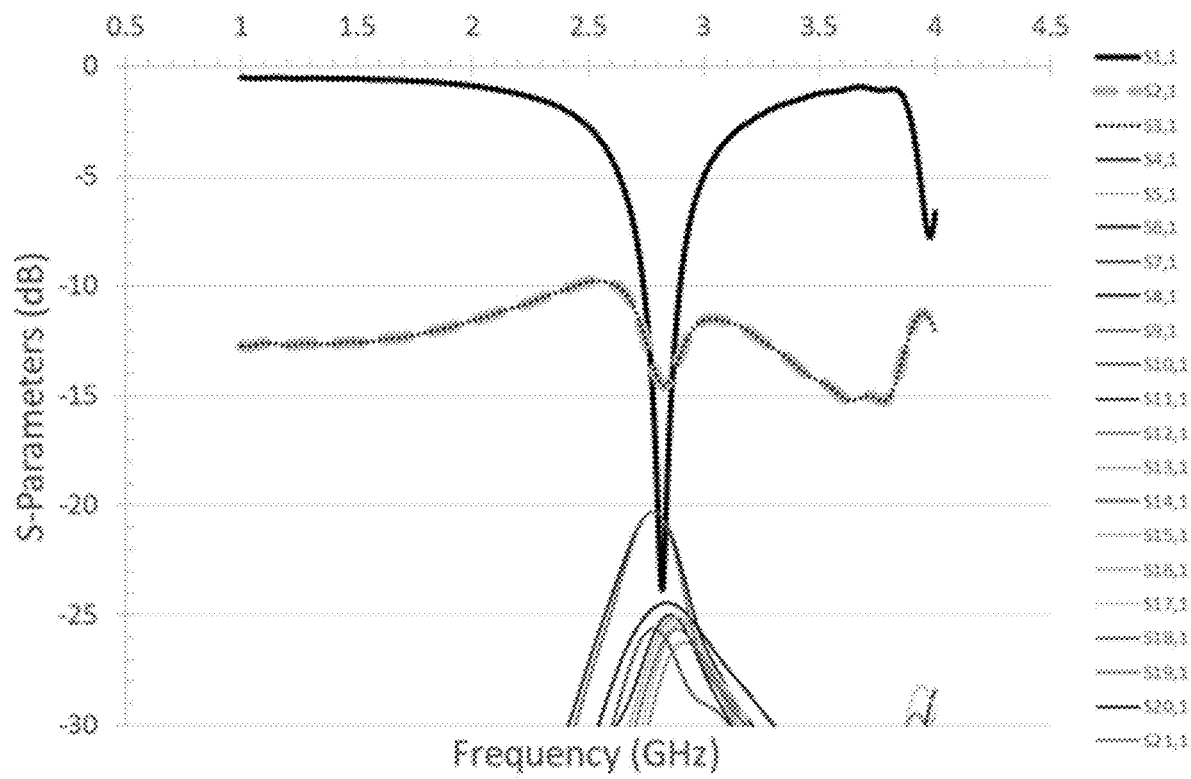
FIG. 10 shows a simulated frequency response of seven antennas with hexagonal ground planes joined together with respect to a first antenna port.

FIG. 10 shows a simulated plot of variation of S-parameters along with frequency with respect to a first antenna port (antenna port 1) of a set of seven compact 3-port antennas. Since the geometry and the excitations of the other antenna ports (antenna ports 2-21) are rotationally symmetric, the S-parameters with respect to the other antenna ports (antenna ports 2-21) would be the same. Further, referring to S2,1 and S3,1 the intra-element mutual coupling for seven antennas is similar to the results discussed above in connection with FIG. 3 (i.e., the antenna resonates at 2.8 GHz with mutual coupling of −15 dB). And referring to S4,1 through S21,1, it can be seen that the inter-element mutual couplings are low (all below −20 dB) when the edge-to-edge neighboring element spacing is $0.54\lambda_0$ and without applying any decoupling techniques. The inter-element mutual couplings mainly depend on the inter-element spacing, so there may be a tradeoff between compact size versus reducing inter-element mutual couplings (i.e., the smaller the inter-element spacing, the higher the inter-element mutual coupling, which may degrade antenna efficiency). As mentioned above, in an exemplary implementation, having 25 mm of inter-element spacing provides for most or all inter-element mutual coupling coefficients being less than −20 dB (less than −15 dB is good enough for most applications).

Figure 11:
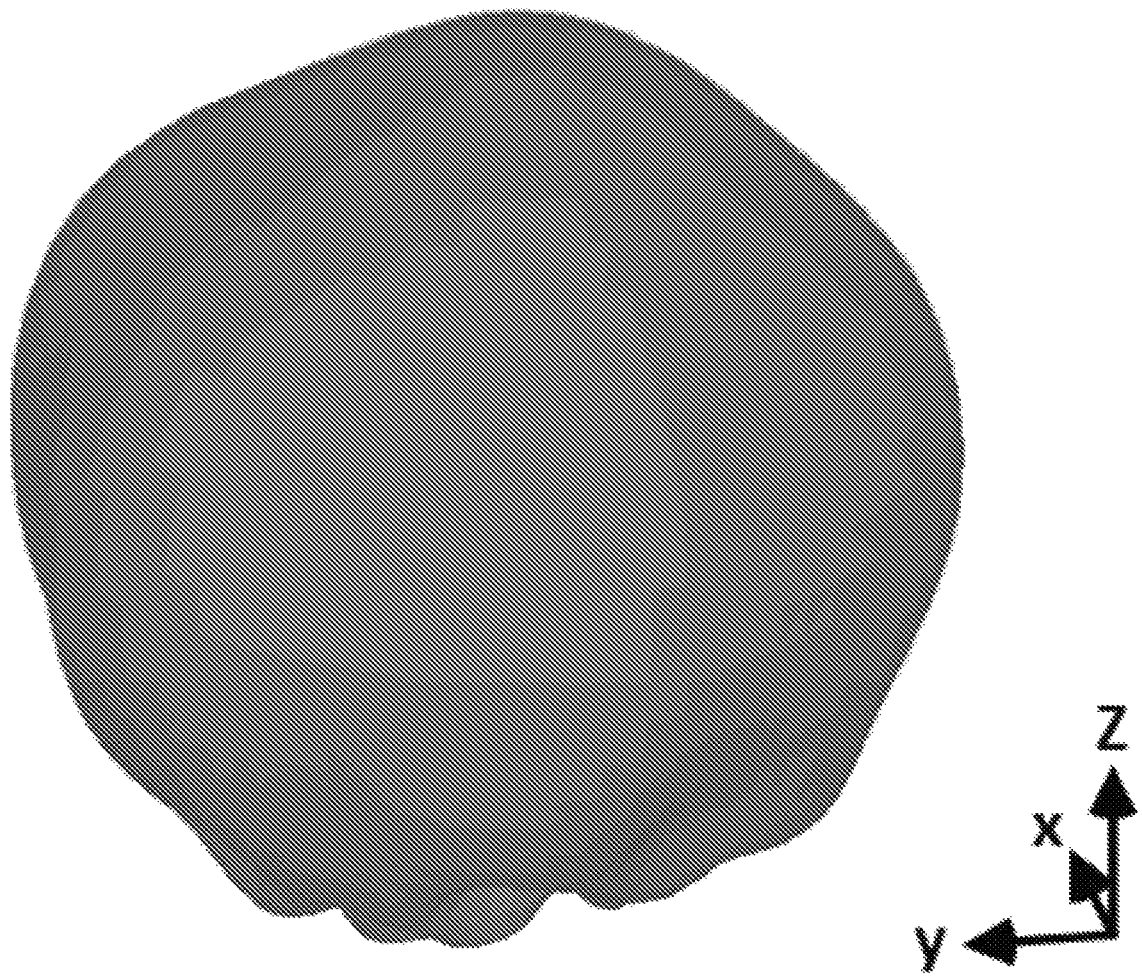
FIG. 11 shows a simulated radiation pattern of seven antennas with hexagonal ground planes joined together with respect to a first antenna port at 2.8 GHz.

FIG. 11 shows a simulated radiation pattern at 2.8 GHz with respect to a first antenna port (antenna port 1) of a set of seven compact 3-port antennas. Since the radiation pattern of antenna port 1 is directed perpendicular to the plane of the top portion of the radiator, so the radiation patterns of the other antenna ports are also directed perpendicular to the plane of the top portion of the radiator due to the rotationally symmetry.

It will be appreciated that more than seven antennas may be joined together, up to virtually any number of antennas. It will further be appreciated that although FIGS. 7-9 show compact 3-port antennas having hexagonal ground planes being joined together, antennas having ground planes of other shapes may also be joined together.

Exemplary embodiments of the invention provide a compact integrated 3-port antenna with broadside radiation patterns. It will be appreciated that the invention is not limited to a specific resonant frequency, which is determined by the size of the antenna. For example, a lower resonant frequency can be obtained by scaling up the size of the antenna.

As discussed above, exemplary embodiments of the invention provide a compact 3-broadside-mode patch antenna.

As discussed above, the performance of the three ports of the 3-broadside-mode patch antenna may be identical due to rotationally symmetric geometry.

As discussed above, low mutual coupling between the three antenna ports can be achieved.

As discussed above, a single patch antenna can generate more than two broadside radiation patterns with low mutual coupling.

As discussed above, a folded snowflake-shaped patch radiator may be used, wherein the shape of the snowflake-shaped patch radiator matches with a hexagonal ground plane. The folded snowflake-shaped patch radiator can reduce the projection area of the overall antenna. The folded snowflake-shaped patch radiator can produce capacitive loading effect resulting of antenna size reduction.

The capacitive feed of antenna port excitations can provide for better impedance matching (by canceling out certain probe inductance). The long and thin antenna probes can be regarded as an inductance from a radio frequency (RF) point of view. The inductance may cause mismatches which introduces mismatched loss to the antenna. The capacitive feed, however, provides additional capacitance near the probe such that probe inductance can be cancelled out.

As discussed above, two or more, or seven or more, hexagonal ground planes can be seamlessly connected together in a manner that can be extended to any number of unit cells without overlap or empty space between unit cells. Additionally, two or more, or seven or more, compact 3-broadside-mode patch antennas can be seamlessly connected together. The compact 3-broadside-mode patch antenna according to exemplary embodiments of the invention can thus be used as a unit cell for building massive MIMO antennas.

It will be appreciated that although the exemplary embodiments described herein utilize a snowflake-shaped radiator having six legs, other types of radiators may be used in other exemplary embodiment. For example, other rotationally symmetric radiators capable of providing three broadside radiation modes may be used (such other radiators having 120-degree rotational symmetry or radiators having 60-degree rotational symmetry).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A three-broadside-mode patch antenna, comprising:
a rotationally symmetric radiator;
a patch, wherein the patch is separated from the rotationally symmetric radiator by a dielectric and configured to capacitively feed the rotationally symmetric radiator; and
three antenna probes, connected to the patch, configured to provide three antenna ports corresponding to three respective broadside radiation polarizations;
wherein the three antenna probes are further configured to simultaneously excite the patch for capacitively feeding the rotationally symmetric radiator and generating the three respective broadside radiation polarizations.

2. The three-broadside-mode patch antenna according to claim 1, wherein the rotationally symmetric radiator is a snowflake-shaped radiator having six legs.

3. The three-broadside-mode patch antenna according to claim 2, wherein each of the six legs comprises two folds.

4. The three-broadside-mode patch antenna according to claim 3, wherein each of the six legs comprises a first portion substantially perpendicular to the patch and a second portion substantially parallel to the patch.

5. The three-broadside-mode patch antenna according to claim 1, wherein the patch is a hexagonal patch.

6. The three-broadside-mode patch antenna according to claim 1, further comprising: a shorting pin; and
a ground plane;
wherein the shorting pin connects the patch to the ground plane.

7. The three-broadside-mode patch antenna according to claim 1, further comprising:
multiple shorting pins; and
a ground plane;
wherein each of the multiple shorting pins connects the patch to the ground plane.

8. The three-broadside-mode patch antenna according to claim 1, wherein the dielectric comprises an air gap.

9. The three-broadside-mode patch antenna according to claim 1, further comprising:
a hexagonal ground plane.

10. The three-broadside-mode patch antenna according to claim 1, wherein the rotationally symmetric radiator is formed in a shape comprising a plurality of legs.

11. A massive multiple-input multiple-output (MIMO) antenna, comprising:
a plurality of three-broadside-mode patch antenna cells, wherein each of the plurality of three-broadside-mode patch antenna cells comprises:
a rotationally symmetric radiator;
a patch, wherein the patch is separated from the rotationally symmetric radiator by a dielectric and configured to capacitively feed the rotationally symmetric radiator; and
three antenna probes, connected to the patch, configured to provide three antenna ports corresponding to three respective broadside radiation polarizations;
wherein the three antenna probes are further configured to simultaneously excite the patch for capacitively feeding the rotationally symmetric radiator and generating the three respective broadside radiation polarizations.

12. The MIMO antenna according to claim 11, wherein each rotationally symmetric radiator is a snowflake-shaped radiator having six legs.

13. The MIMO antenna according to claim 12, wherein each of the six legs comprises two folds.

14. The MIMO antenna according to claim 13, wherein each of the six legs comprises a first portion substantially perpendicular to the patch and a second portion substantially parallel to the patch.

15. The MIMO antenna according to claim 11, wherein the patch is a hexagonal patch.

16. The MIMO antenna according to claim 11, wherein each of the plurality of three-broadside-mode patch antenna cells further comprises: a shorting pin; and
a ground plane;
wherein the shorting pin connects the patch to the ground plane.

17. The MIMO antenna according to claim 11, wherein each of the plurality of three-broadside-mode patch antenna cells further comprises:
multiple shorting pins; and
a ground plane;
wherein each of the multiple shorting pins connects the patch to the ground plane.

18. The MIMO antenna according to claim 11, wherein the dielectric comprises an air gap.

19. The MIMO antenna according to claim 11, wherein each of the plurality of three-broadside-mode patch antenna cells further comprises:
 a hexagonal ground plane.

20. The MIMO antenna according to claim 11, further comprising:
 a common ground plane for the plurality of three-broadside-mode patch antenna cells.

21. The MIMO antenna according to claim 11, wherein a first three- broadside-mode patch antenna cell of the plurality of three-broadside-mode patch antenna cells comprises a hexagonal ground plane and has six adjacent three-broadside-mode patch antenna cells, each bordering the first three-broadside-mode patch antenna cell on a respective side of the hexagonal ground plane.

22. A three-broadside-mode patch antenna, comprising:
 a rotationally symmetric radiator;
 a patch, wherein the patch is separated from the rotationally symmetric radiator by a dielectric and configured to capacitively feed the rotationally symmetric radiator; and
 three antenna probes, connected to the patch, configured to provide three antenna ports corresponding to three respective broadside radiation polarizations;
 wherein the rotationally symmetric radiator is a snowflake-shaped radiator having six legs.

\* \* \* \* \*